US011989648B2

(12) United States Patent
Kulkarni et al.

(10) Patent No.: US 11,989,648 B2
(45) Date of Patent: May 21, 2024

(54) MACHINE LEARNING BASED APPROACH TO DETECT WELL ANALOGUE

(71) Applicant: Schlumberger Technology Corporation, Sugar Land, TX (US)

(72) Inventors: Mandar Shrikant Kulkarni, Pune (IN); Hiren Maniar, Houston, TX (US); Aria Abubakar, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 923 days.

(21) Appl. No.: 16/948,281

(22) Filed: Sep. 11, 2020

(65) Prior Publication Data

US 2021/0089892 A1 Mar. 25, 2021

(30) Foreign Application Priority Data

Sep. 24, 2019 (IN) .............................. 201921038601

(51) Int. Cl.
*G06N 3/08* (2023.01)
*G06F 16/245* (2019.01)
*G06F 16/248* (2019.01)

(52) U.S. Cl.
CPC ............. *G06N 3/08* (2013.01); *G06F 16/245* (2019.01); *G06F 16/248* (2019.01)

(58) Field of Classification Search
CPC ........ G06N 3/08; G06F 16/245; G06F 16/248
See application file for complete search history.

(56) References Cited

U.S. PATENT DOCUMENTS

2019/0034793 A1* 1/2019 Kataria ................... G06N 3/048
2019/0080225 A1* 3/2019 Agarwal ................ G06N 3/044

FOREIGN PATENT DOCUMENTS

WO WO-2018208634 A1 * 11/2018 ............. G01V 1/306

OTHER PUBLICATIONS

Li, Xiang, Xinyu Fu, Zheng Lu, Ruibin Bai, Uwe Aickelin, Peiming Ge, and Gong Liu. "Retrieving and ranking short medical questions with two stages neural matching model." In 2019 IEEE Congress on Evolutionary Computation (CEC), pp. 873-879. IEEE, 2019. (Year: 2019).*
Pflugfelder, Roman. "An in-depth analysis of visual tracking with siamese neural networks." arXiv preprint arXiv:1707.00569v2 (2018). (Year: 2018).*
Abdelpakey, Mohamed H., Mohamed S. Shehata, and Mostafa M. Mohamed. "DensSiam: End-to-End Densely-Siamese Network with Self-Attention Model for Object Tracking." arXiv preprint arXiv:1809.02714 (2018). (Year: 2018).*

* cited by examiner

*Primary Examiner* — Casey R. Garner
(74) *Attorney, Agent, or Firm* — Michael Guthrie

(57) ABSTRACT

A training log is selected from a plurality of well logs. A log window of a plurality of log windows is selected from the training log. A positive window is generated from the log window. A negative window is selected from the training log. A siamese neural network (SNN) is trained that includes a first self attention neural network (ANN) and a duplicate self attention neural network with the log window, the positive window, and the negative window, to recognize a similarity between the log window and the positive window and to differentiate against the negative window.

17 Claims, 10 Drawing Sheets

MACHINE LEARNING BASED APPROACH TO DETECT WELL ANALOGUE

CROSS-REFERENCE TO RELATED APPLICATION(S)

This disclosure claims priority from India Patent Application No. 201921038601, filed on Sep. 24, 2019, entitled "A Machine Learning Based Approach to Detect Well Analogue," herein incorporated by reference in its entirety.

BACKGROUND

Well logs record multiple properties of a borehole of a well. A window or subset of a well log may identify features of interest about a well. A challenge is to search databases with millions of well logs for well logs that include windows that are similar to a query window.

SUMMARY

In general, in one or more aspects, the disclosure relates to a machine learning based approach to detect well analogue. A training log is selected from a plurality of well logs. A log window of a plurality of log windows is selected from the training log. A positive window is generated from the log window. A negative window is selected from the training log. A siamese neural network (SNN) is trained that includes a first self attention neural network (ANN) and a duplicate self attention neural network with the log window, the positive window, and the negative window, to recognize a similarity between the log window and the positive window and to differentiate against the negative window.

Other aspects will be apparent from the following description and the appended claims.

DETAILED DESCRIPTION

Figure 1:
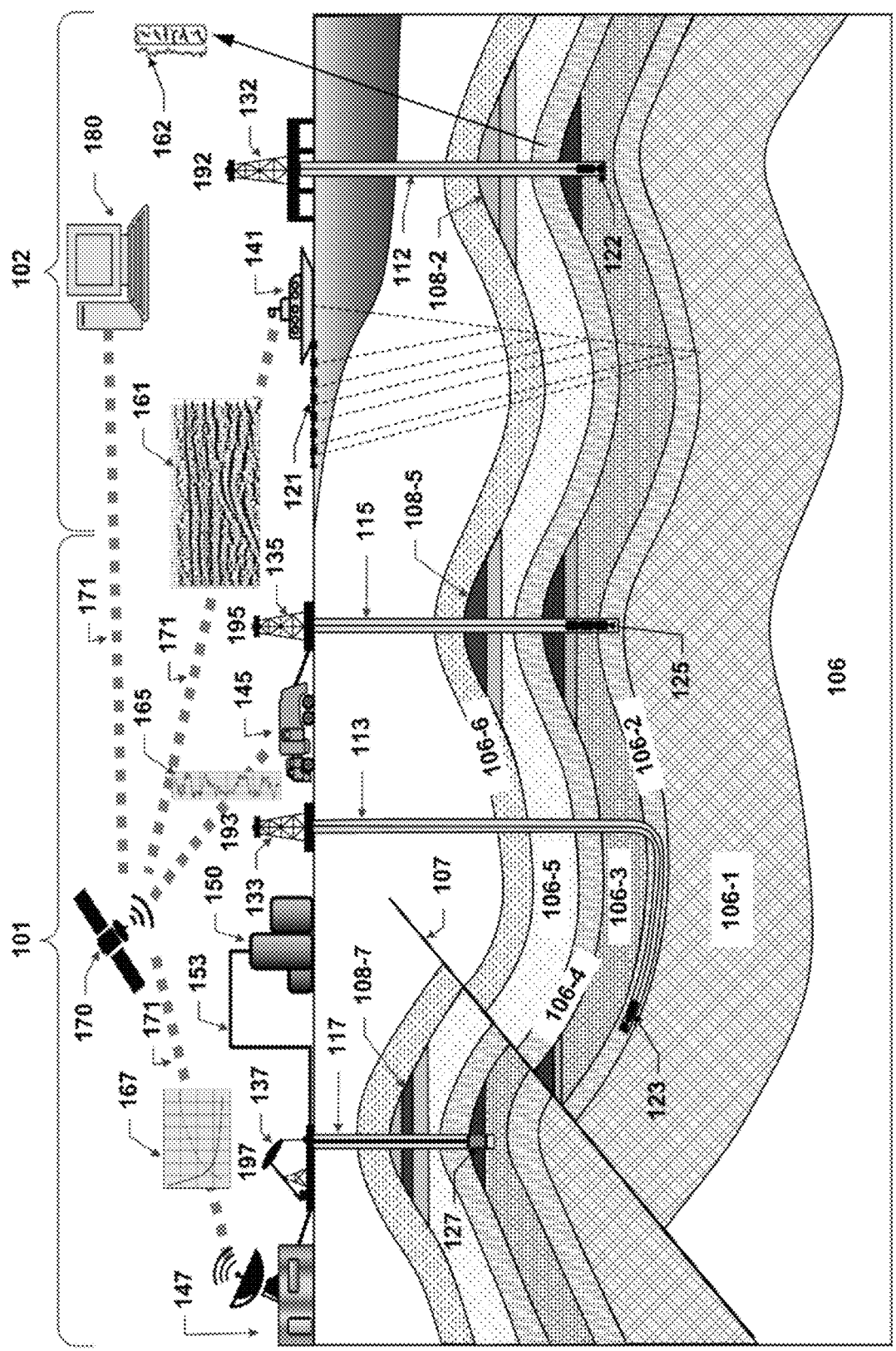
FIG. 1 shows a diagram of a system in accordance with disclosed embodiments.

Specific embodiments will now be described in detail with reference to the accompanying figures. Like elements in the various figures are denoted by like reference numerals for consistency.

In the following detailed description of embodiments of the technology, numerous specific details are set forth in order to provide a more thorough understanding. However, it will be apparent to one of ordinary skill in the art that various embodiments may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to be a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments train a siamese neural network to identify the similarity between windows of data from well logs. After training the siamese neural network, a user may select a query window and select a set of wells and well logs to be searched. The well logs are split into target windows that are compared to the query window. Wells that include windows similar to the query window are identified by the output from the siamese neural network and are presented to the user. With this system, the user may search a database of well logs to identify wells that have features similar to the features from the query window instead of manually comparing well logs. The user may then tag the features of the windows, logs, and wells.

A target window may be a log or section thereof against which a query window is compared. Matching a query window against the windows of a well or multitudes of wells is a "search problem". Target windows may be defined in context of search and is based on the specific search algorithm adopted. For fast narrowing of this search for the signature of a query window, initially a non-overlapping set of target windows may be obtained from a well and matched against the query window. The match outputs may be ranked and the highest threshold number of ranked matches may provide a rough bracketing for finer query matching and, at this point, a set of overlapping windows can be defined as a set of target windows against which the query window is matched. Other search methods may be employed when the algorithm is being used for querying.

Turning now to the Figures, FIG. 1 depicts a schematic view, partially in cross section, of an onshore field (101) and an offshore field (102) in which one or more embodiments may be implemented. One or more of the modules and elements shown in FIG. 1 may be omitted, repeated, and/or substituted. Accordingly, embodiments should not be considered limited to the specific arrangement of modules shown in FIG. 1.

As shown in FIG. 1, the fields (101), (102) include a geologic sedimentary basin (106), wellsite systems (192), (193), (195), (197), wellbores (112), (113), (115), (117), data acquisition tools (121), (123), (125), (127), surface units (141), (145), (147), well rigs (132), (133), (135), production equipment (137), surface storage tanks (150), production pipelines (153), and an E&P computer system (180) connected to the data acquisition tools (121), (123), (125), (127), through communication links (171) managed by a communication relay (170).

The geologic sedimentary basin (106) contains subterranean formations. As shown in FIG. 1, the subterranean formations may include several geological layers (106-1 through 106-6). As shown, the formation may include a basement layer (106-1), one or more shale layers (106-2, 106-4, 106-6), a limestone layer (106-3), a sandstone layer (106-5), and any other geological layer. A fault plane (107) may extend through the formations. In particular, the geologic sedimentary basin includes rock formations and may include at least one reservoir including fluids, for example the sandstone layer (106-5). The rock formations may include at least one seal rock, for example, the shale layer (106-6), which may act as a top seal. The rock formations may include at least one source rock, for example the shale layer (106-4), which may act as a hydrocarbon generation source. The geologic sedimentary basin (106) may further contain hydrocarbon or other fluids accumulations associated with certain features of the subsurface formations. For example, accumulations (108-2), (108-5), and (108-7) associated with structural high areas of the reservoir layer (106-5) and containing gas, oil, water or any combination of these fluids.

Data acquisition tools (121), (123), (125), and (127), may be positioned at various locations along the field (101) or field (102) for collecting data from the subterranean formations of the geologic sedimentary basin (106), referred to as survey or logging operations. In particular, various data acquisition tools are adapted to measure the formation and detect the physical properties of the rocks, subsurface formations, fluids contained within the rock matrix and the geological structures of the formation. For example, data plots (161), (162), (165), and (167) are depicted along the fields (101) and (102) to demonstrate the data generated by the data acquisition tools. Specifically, the static data plot (161) is a seismic two-way response time. Static data plot (162) is core sample data measured from a core sample of any of subterranean formations (106-1 to 106-6). Static data plot (165) is a logging trace, referred to as a well log. Production decline curve or graph (167) is a dynamic data plot of the fluid flow rate over time. Other data may also be collected, such as historical data, analyst user inputs, economic information, and/or other measurement data and other parameters of interest.

The acquisition of data shown in FIG. 1 may be performed at various stages of planning a well. For example, during early exploration stages, seismic data (161) may be gathered from the surface to identify possible locations of hydrocarbons. The seismic data may be gathered using a seismic source that generates a controlled amount of seismic energy. In other words, the seismic source and corresponding sensors (121) are an example of a data acquisition tool. An example of seismic data acquisition tool is a seismic acquisition vessel (141) that generates and sends seismic waves below the surface of the earth. Sensors (121) and other equipment located at the field may include functionality to detect the resulting raw seismic signal and transmit raw seismic data to a surface unit (141). The resulting raw seismic data may include effects of seismic wave reflecting from the subterranean formations (106-1 to 106-6).

After gathering the seismic data and analyzing the seismic data, additional data acquisition tools may be employed to gather additional data. Data acquisition may be performed at various stages in the process. The data acquisition and corresponding analysis may be used to determine where and how to perform drilling, production, and completion operations to gather downhole hydrocarbons from the field. Generally, survey operations, wellbore operations and production operations are referred to as field operations of the field (101) or (102). These field operations may be performed as directed by the surface units (141), (145), (147). For example, the field operation equipment may be controlled by a field operation control signal that is sent from the surface unit.

Further as shown in FIG. 1, the fields (101) and (102) include one or more wellsite systems (192), (193), (195), and (197). A wellsite system is associated with a rig or a production equipment, a wellbore, and other wellsite equipment configured to perform wellbore operations, such as logging, drilling, fracturing, production, or other applicable operations. For example, the wellsite system (192) is associated with a rig (132), a wellbore (112), and drilling equipment to perform drilling operation (122). A wellsite system may be connected to a production equipment. For example, the well system (197) is connected to the surface storage tank (150) through the fluids transport pipeline (153).

The surface units (141), (145), and (147), may be operatively coupled to the data acquisition tools (121), (123), (125), (127), and/or the wellsite systems (192), (193), (195), and (197). In particular, the surface unit is configured to send commands to the data acquisition tools and/or the wellsite systems and to receive data therefrom. The surface units may be located at the wellsite system and/or remote locations. The surface units may be provided with computer facilities (e.g., an E&P computer system) for receiving, storing, processing, and/or analyzing data from the data acquisition tools, the wellsite systems, and/or other parts of the field (101) or (102). The surface unit may also be provided with, or have functionality for actuating, mechanisms of the wellsite system components. The surface unit may then send command signals to the wellsite system components in response to data received, stored, processed, and/or analyzed, for example, to control and/or optimize various field operations described above.

The surface units (141), (145), and (147) may be communicatively coupled to the E&P computer system (180) via the communication links (171). The communication between the surface units and the E&P computer system may be managed through a communication relay (170). For example, a satellite, tower antenna or any other type of communication relay may be used to gather data from multiple surface units and transfer the data to a remote E&P computer system for further analysis. Generally, the E&P computer system is configured to analyze, model, control, optimize, or perform management tasks of the aforementioned field operations based on the data provided from the surface unit. The E&P computer system (180) may be provided with functionality for manipulating and analyzing the data, such as analyzing seismic data to determine locations of hydrocarbons in the geologic sedimentary basin (106) or performing simulation, planning, and optimization of E&P operations of the wellsite system. The results generated by the E&P computer system may be displayed for user to view the results in a two-dimensional (2D) display, three-dimensional (3D) display, or other suitable displays. Although the surface units are shown as separate from the E&P computer system in FIG. 1, in other examples, the surface unit and the E&P computer system may also be combined. The E&P computer system and/or surface unit may correspond to a computing system, such as the computing system shown in FIGS. 7A and 7B and described below.

Figure 2A:
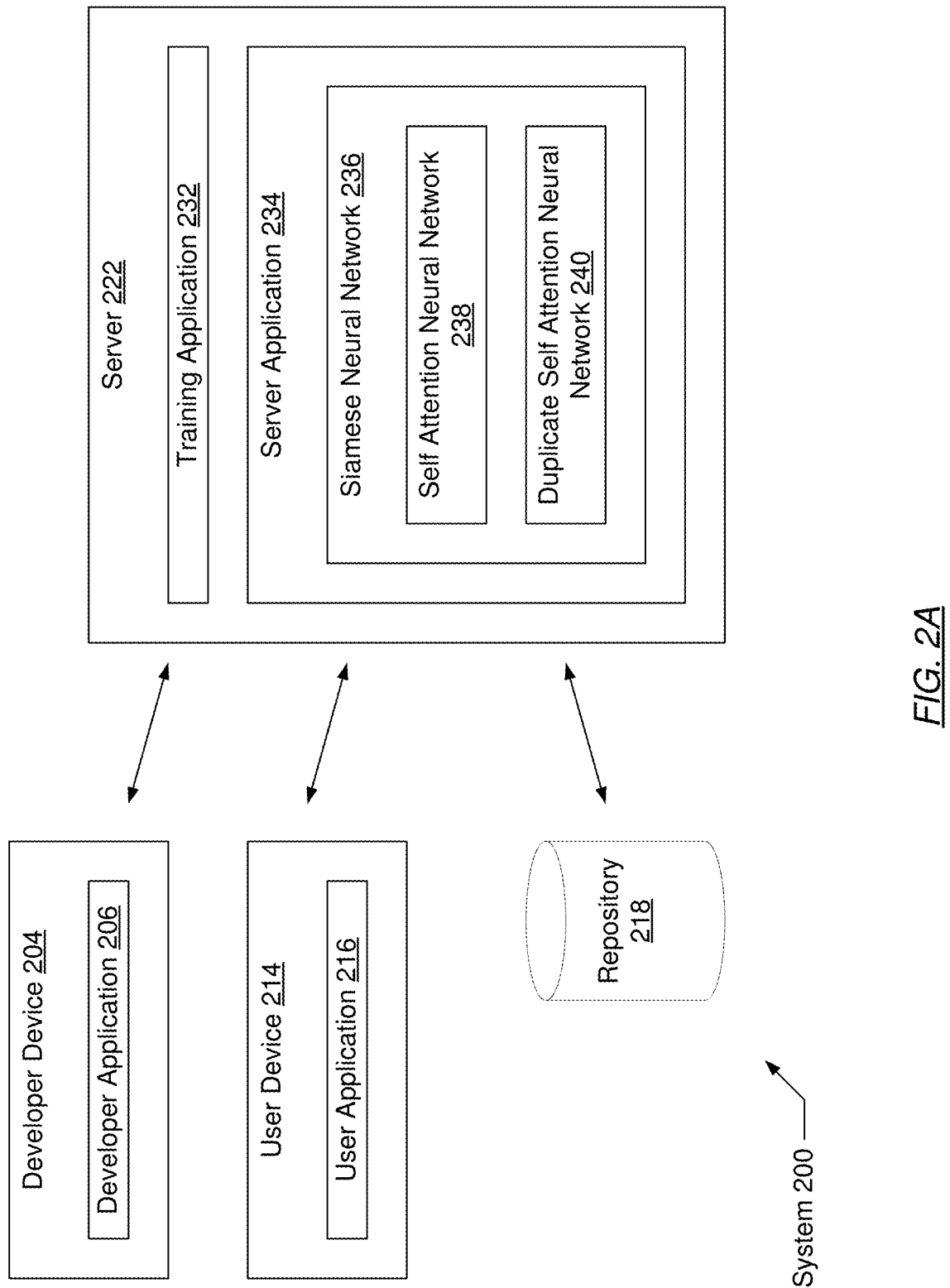
FIG. 2A, FIG. 2B, and FIG. 2C show diagrams of systems in accordance with disclosed embodiments.
Figure 2B:
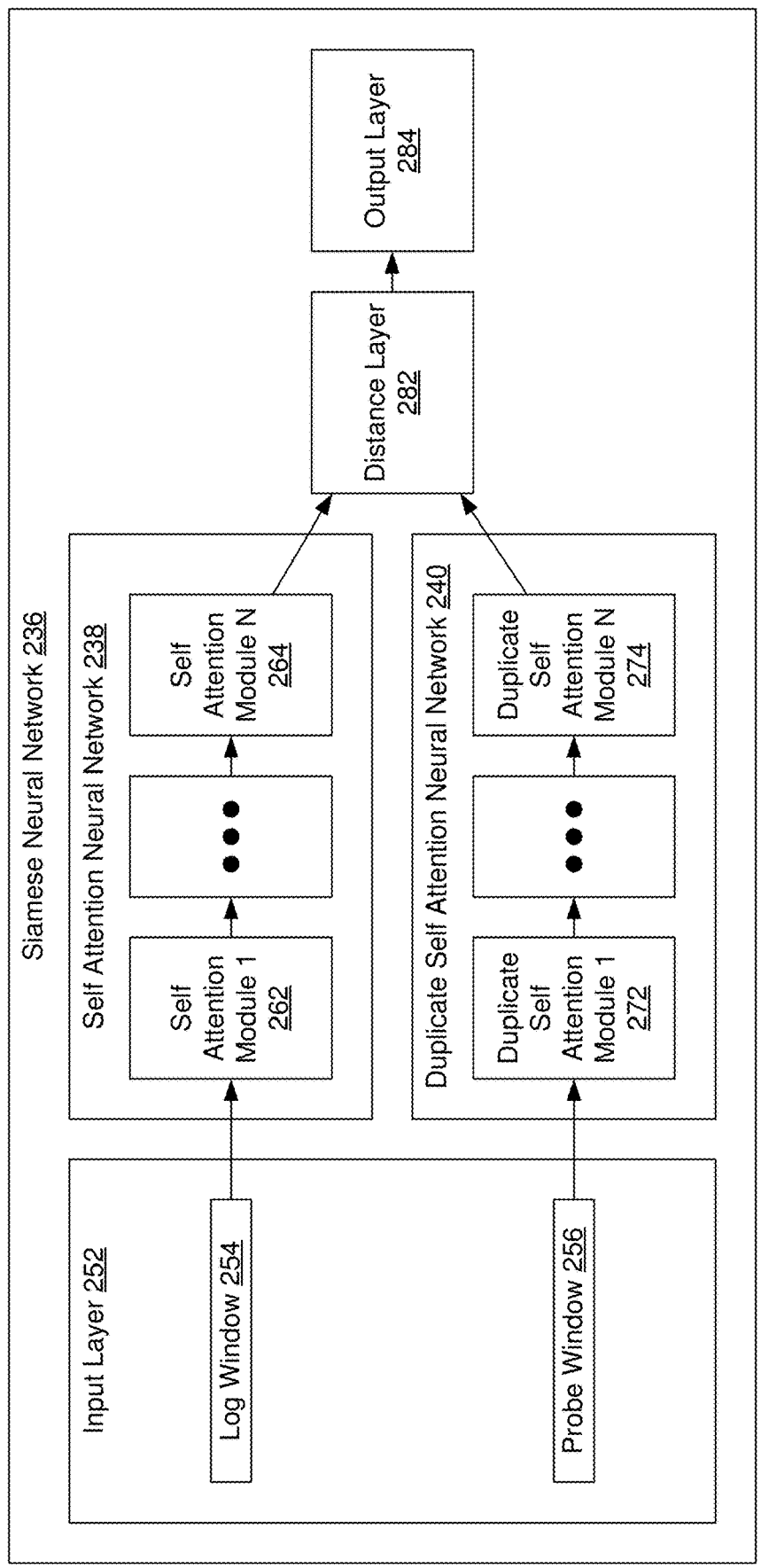
Figure 2C:
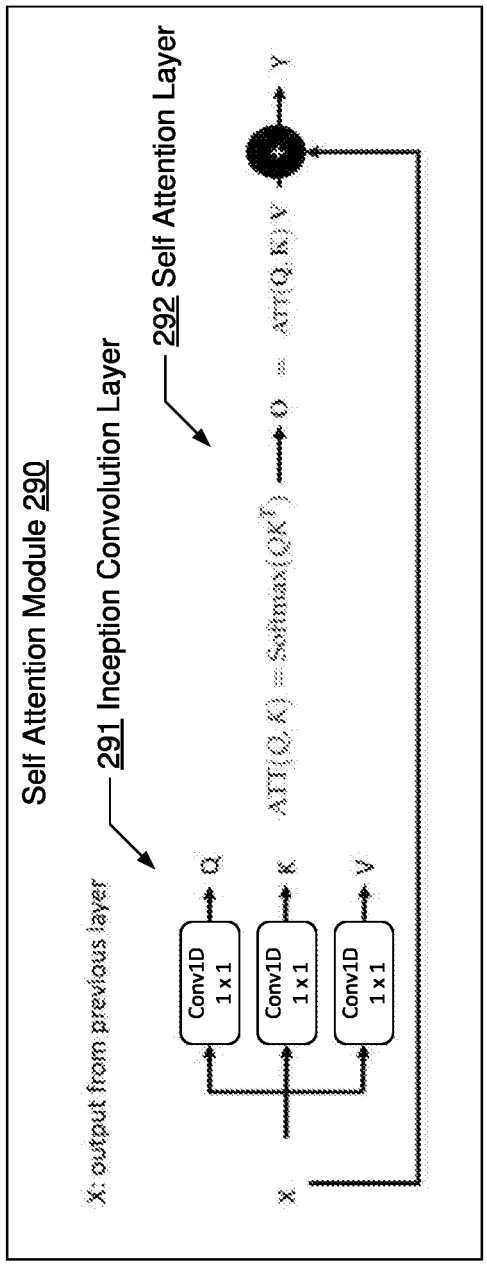

FIGS. 2A, 2B, and 2C show diagrams of embodiments that are in accordance with the disclosure. The various elements, systems, and components shown in FIGS. 2A, 2B, and 2C may be omitted, repeated, combined, and/or altered as shown from FIGS. 2A, 2B, and 2C. Accordingly, the scope of the present disclosure should not be considered limited to the specific arrangements shown in FIGS. 2A, 2B, and 2C.

Turning to FIG. 2A, the system (200) includes the server (222) that detects well analogues using machine learning. The server (222) includes the server application (234) and the training application (232). The server application (234) includes the siamese neural network (236), which includes the self attention neural network (238) and the duplicate self attention neural network (240). The system (200) may include the combined features and embodiments described in FIGS. 1, 2B, 2C, 3A, 3B, 4, 5, 6, 7A, and 7B.

The siamese neural network (236) is a dual neural network that uses the same weights while processing in tandem on two different input vectors (tensors) to compute scores or comparable output tensors. Specifically, the dual neural network has the self attention neural network (238) and the duplicate self attention neural network (240). Attention in neural networks equip the neural network with the ability to focus on a subset of its inputs (or features) allowing the network to model long term dependencies.

The input vectors are windows of well logs that are input to the self attention neural network (238) and the duplicate self attention neural network (240). The outputs from the self attention neural network (238) and the duplicate self attention neural network (240) are compared by the siamese neural network (236) to determine the similarity of the inputs. The siamese neural network (236) is further described in FIG. 2B.

A well log is a detailed record of the geologic formations penetrated by a borehole. The log may be based either on the inspection of samples from the well or on physical measurements made by instruments lowered into a borehole. Well logs can be made during any phase of a well's history: drilling, completing, producing, or abandoning. Well logging is performed in boreholes drilled for oil and gas, groundwater, mineral and geothermal exploration, environmental and geotechnical studies, etc. Logging tools measure and record the petrophysical properties of the well, including natural gamma ray, electrical, acoustic, stimulated radioactive response, electromagnetic, nuclear magnetic resonance, pressure, and other properties of the rocks and contained fluids of a well. The well log may be an electronic record stored in a repository. A well log may have a resolution that identifies the spacing between measurements. As an example, a resolution for a well log may be 0.5 feet of depth down the well. Well logs may be split and combined to include measurements of a single property or multiple properties, identified as channels of the well log. A well log may have rows that correspond to the depth at which a measurement is taken and columns that correspond to the channels for the different types of properties that are measured.

A window of a well log is a subset of the well log. A window may include a set of contiguous rows from the well log. In such embodiments, the window is a contiguous portion of the well log. The number of rows and the number of channels of the window matches to the input data dimensions required by the siamese neural network (236).

The self attention neural network (238) uses a self attention algorithm to generate an output vector from an input vector. The duplicate self attention neural network (240) is a duplicate of the self attention neural network (238) having the same network structure and weights as the self attention neural network (238). The self attention neural network (238) and the duplicate self attention neural network (240) are further described in FIG. 2B.

Figure 7A:
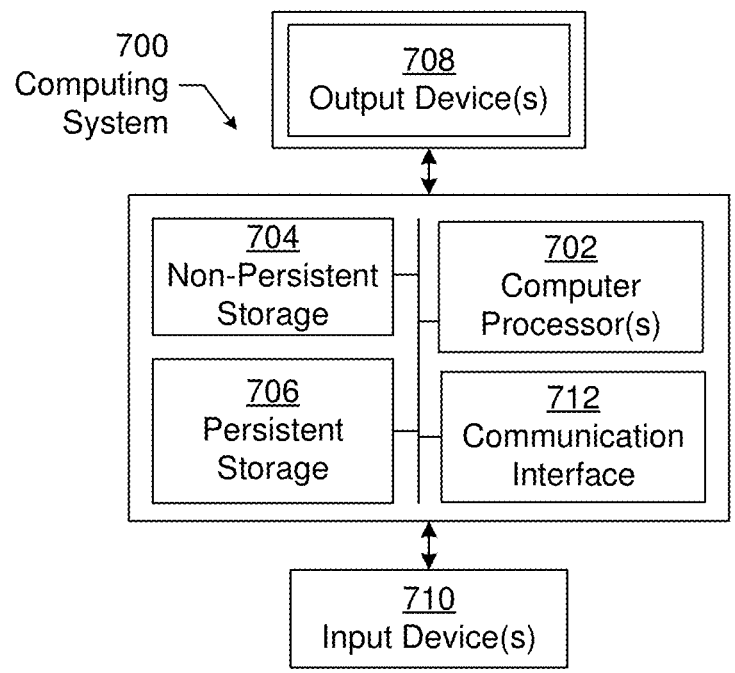
FIG. 7A and FIG. 7B show computing systems in accordance with disclosed embodiments.
Figure 7B:
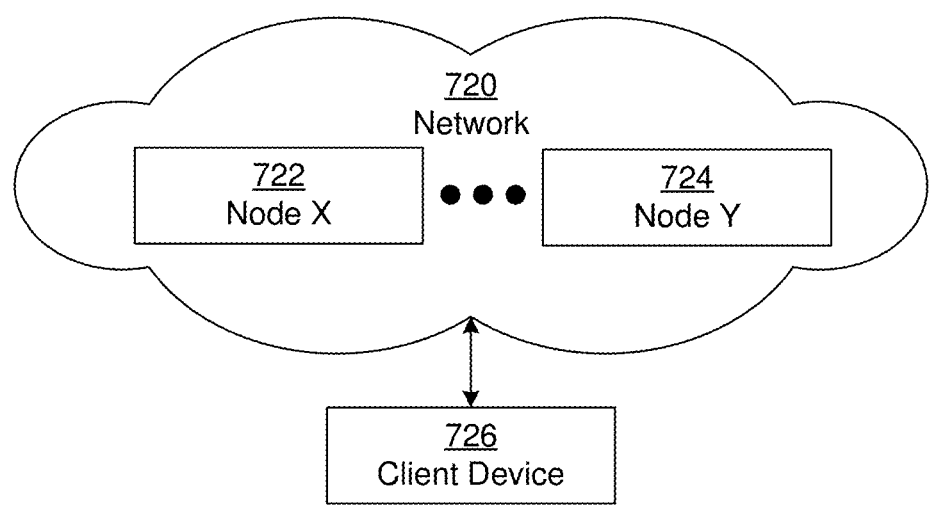

The server (222) is an embodiment of the computing system (700) and the nodes (722) and (724) of FIG. 7A and FIG. 7B. The server (222) includes the training application (232) and the server application (234). The server (222) may be operated by an oilfield services provider to determine well analogues with the training application (232) and the server application (234).

The training application (232) is a set of programs on the server (222) that trains the machine learning models (e.g., the siamese neural network (236), the self attention neural network (238), and the duplicate self attention neural network (240)) used by the server application (234). The machine learning models may be trained with well logs from the repository (218).

The server application (234) is a set of programs on the server (222) that searches well logs from the repository (218) to identify the well logs that include windows that are similar to a query window. The server application (234) may present results generated with the siamese neural network (236) to the user application (216) of the user device (214).

The developer device (204) is an embodiment of the computing system (700) and the nodes (722) and (724) of FIG. 7A and FIG. 7B. The developer device (204) includes the developer application (206) for accessing the training application (232). The developer application (206) may include a graphical user interface for interacting with the training application (232) to train the siamese neural network (236). The developer application (206) may be part of a development environment that controls the development, training, and deployment of the server application (234) using the training application (232).

The user device (214) is an embodiment of the computing system (700) and the nodes (722) and (724) of FIG. 7A and FIG. 7B. The user device (214) includes the user application (216) for accessing the server application (234). The user application (216) may include a graphical user interface for interacting with the server application (234) to determine the well analogues by searching a database of well logs with a query window. A user may operate the user application (216) to select a query window and to select one or more target wells and well logs from the repository (218) that the query window is searched against. The results of the search are then displayed by the user device (214) in the user application (216). The user device (214) may be operated by a customer of the oilfield services provider.

The developer application (206) and the user application (216) may be web browsers that access the training application (232) and the server application (234) using web pages hosted by the server (222). In additional embodiments, the developer application (206) and the user application (216) may be web services that communicate with the training application (232) and the server application (234) using a representational state transfer application programming interface (RESTful API). Although FIG. 1 shows a client server architecture, one or more parts of the server application may be a local application on the user device without departing from the claimed scope. The server application may use remote data and/or local data to determine well analogues.

The repository (218) is a computing system that may include multiple computing devices in accordance with the computing system (700) and the nodes (722) and (724) described below in FIGS. 7A and 7B. The repository (218) may be hosted by a cloud service provider for the oilfield services provider. The cloud service provider may provide hosting, virtualization, and data storage services as well as other cloud services and the oilfield services provider may operate and control the data, programs, and applications that determine well analogues. The data in the repository (218) may include one or more versions of multiple well logs of multiple geographic locations. The data in the repository (218) may be processed by programs executing on the server (222) as described below. The repository (218) may be hosted by the same cloud services provider as the server (222).

Turning to FIG. 2B, the siamese neural network (236) generates result outputs that identify the similarity between two inputs, the log window (254) and the probe window (256) using multiple layers. The siamese neural network (236) may include the input layer (252), one or more self attention modules in the self attention neural network (238), one or more self attention modules in the duplicate self attention neural network (240), the distance layer (282), and the output layer (284).

The input layer (252) receives the inputs for the siamese neural network (236), which include the log window (254) and the probe window (256). The log window (254) and the probe window (256) may be windows from well logs and are compared by the siamese neural network (236).

The self attention neural network (238) includes one or more self attention modules (262) though (264) that may each include inception convolution layers and self attention layers. The self attention modules (262) though (264) have similar structures that generate an output Y from an input X, using the equations below, which are also illustrated in the self attention module (290) of FIG. 2C. The self attention module (290) may include the inception convolution layer (291) and the self attention layer (292). The inception convolution layer (291) may be represented by Equations 4 through 6 below. The self attention layer (292) may be represented by Equations 1 through 3 below. Different equations for self attention and inception may be used within the self attention module (290).

$$Y = X + O \qquad \text{Eq. (1)}$$

$$O = ATT(Q,K)V \qquad \text{Eq. (2)}$$

$$ATT(Q,K) = \text{softmax}(QK^T) \qquad \text{Eq. (3)}$$

$$Q = \text{Conv1D}(X) \qquad \text{Eq. (4)}$$

$$K = \text{Conv1D}(X) \qquad \text{Eq. (5)}$$

$$V = \text{Conv1D}(X) \qquad \text{Eq. (6)}$$

X is an input of one of the self attention modules (262) through (264). The first module (262) of the self attention neural network (238) receives the log window (254) as the input and subsequent modules of the self attention neural network (238) receive outputs from the previous self attention modules.

Y is an output of one of the self attention modules (262) through (264). The end module (264) of the self attention neural network (238) may be the output of the self attention neural network (238) and the modules before the end module of the self attention neural network (238) output values that are used as inputs to subsequent modules of the self attention neural network (238).

O is an intermediate value generated from multiplying the output of the self attention function (ATT) with the value of V.

ATT is a self attention function that applies the softmax function to Q times the transposition of K.

The softmax function within the ATT self attention function takes as input a vector of H real numbers and normalizes the input into a probability distribution of H probabilities proportional to the exponentials of the input numbers having an output in the interval (0,1). The components of H add up to 1.

Q, K, and V are different vectors generated from different one dimensional convolutional neural networks (CNNs, identified as "Conv1D" in the equations above) applied to X. The one dimensional convolutional neural networks for Q, K, and V may be different for Q, K, and V and be different for the different layers and modules of the self attention neural network (238).

Convolutional neural networks are regularized versions of multilayer perceptrons. Multilayer perceptrons may be fully connected artificial neural networks with a neuron in one layer is connected to the neurons in the next layer. Convolutional neural networks take advantage of the hierarchical pattern in data and assemble more complex patterns using smaller and simpler patterns.

Turning back to FIG. 2B, the duplicate self attention neural network (240) is the same as the self attention neural network (238). The duplicate self attention neural network (240) has the same number of modules (272) through (274) with the same weights as the self attention neural network (238). The input to the duplicate self attention neural network (240) is the probe window (256).

The distance layer (282) generates a value that identifies a distance between the outputs of the self attention neural network (238) and the duplicate self attention neural network (240). A number of different distance functions may be used. An equation below is an example which may be used to identify the distance between outputs of the self attention neural network (238) and the duplicate self attention neural network (240).

$$\text{Distance} = \text{Mean}(\text{abs}(X1 - X2)) \qquad \text{Eq. (7)}$$

The equation above takes the mean of the absolute value of the differences between the output of the self attention neural network (238), represented as X1, and the output of the duplicate self attention neural network (240), represented as X2, to generate a single scalar value in the interval of $[0, +\infty)$.

The output layer (284) generates the output of the siamese neural network (236) from the output of the distance layer (282). An equation below is an example which may be used to generate the output, which is within the interval (0, 1] and may be a single probability value of one dimension.

$$\text{Output} = e^{(-\text{abs}(\text{Distance}))} \qquad \text{Eq. (8)}$$

Figure 3A:
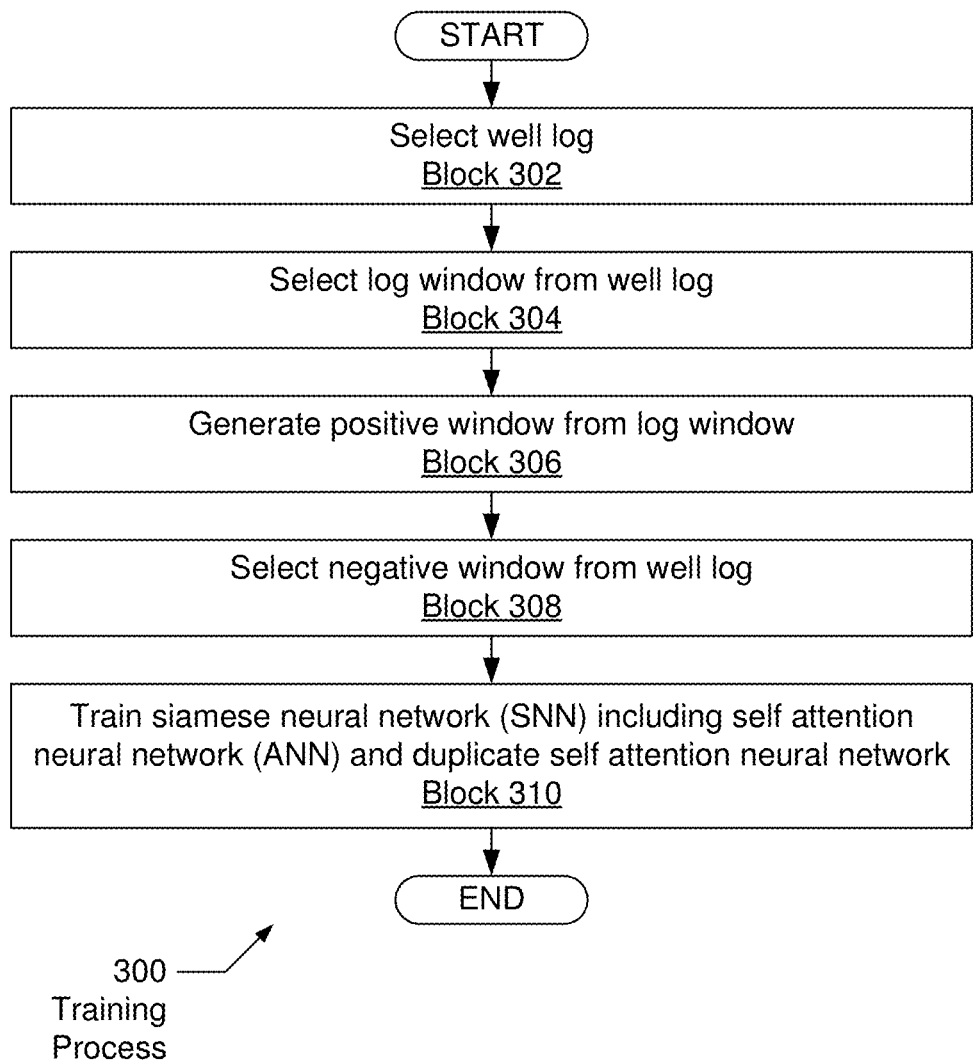
FIG. 3A and FIG. 3B show flowcharts in accordance with disclosed embodiments.
Figure 3B:
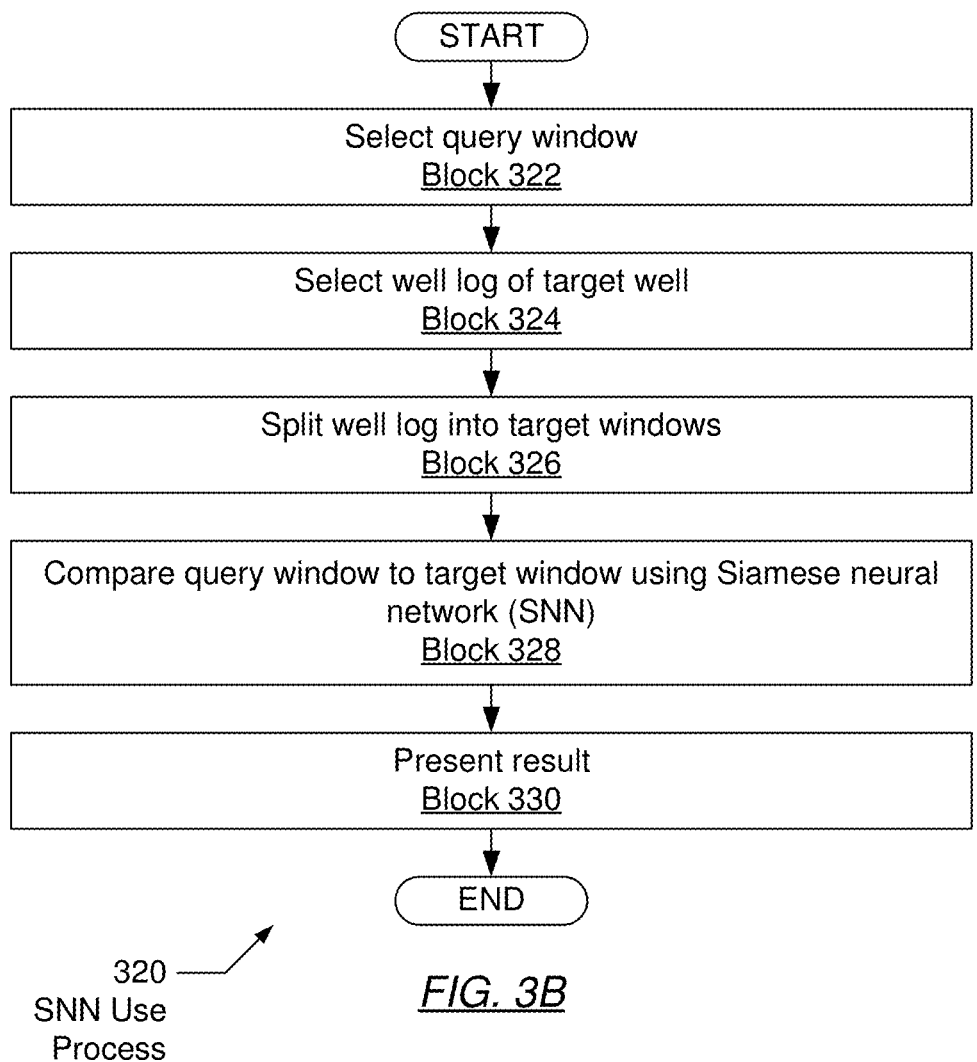

FIG. 3A and FIG. 3B show flowcharts of the process (300) and the process (320) in accordance with the disclosure for detecting well analogues that may be performed with the system (200) of FIG. 2A. While the various blocks in the flowcharts are presented and described sequentially, one of ordinary skill will appreciate that at least some of the blocks may be executed in different orders, may be combined or omitted, and at least some of the blocks may be executed in parallel. Furthermore, the blocks may be performed actively or passively. For example, some blocks may be performed using polling or be interrupt driven. By way of an example, determination blocks may not have a processor process an instruction unless an interrupt is received to signify that condition exists. As another example, determinations may be performed by performing a test, such as checking a data value to test whether the value is consistent with the tested condition.

Turning to FIG. 3A, the process (300) trains the models for detecting well analogues. In Block 302, a well log is selected. The well log may be one of a plurality of well logs stored in a repository. The well log may be selected by a program that cycles through a set of well logs in the repository to train the siamese neural network. The set of well logs may be selected by a developer with a developer device.

In Block 304, a log window is selected from a well log. The training process (300) may select a contiguous portion along the depth axis of the well log that includes the channels from the well log based on the window size of the log window. The window size may be the number of rows of data from a log that are present in a window (e.g., 10, 50, 100, etc.). The window size may be selected by a developer using the developer application. The log window may be randomly selected from the well log.

In Block 306, a positive window is generated from the log window. A transformation may be applied to the log window to create the positive window from the log window. The transformation may be to add noise to the log window, resample the log window, rescale the log window, etc. For example, the transformation may resample the log window to generate a positive window that shrinks or expands the data from the log window along the depth axis. In one or embodiments, the transformation shrinks the log window by a random percentage amount (e.g., by randomly selected percentage value between 0 and 20%) to generate the positive window.

In Block 308, a negative window is selected from the well log. The negative window may be a randomly selected nonoverlapping window from the same well log from which the log window was selected. A transformation may be applied to the negative window.

In Block 310, a siamese neural network that includes a self attention neural network and a duplicate self attention neural network is trained. A first self attention neural network output is generated with the first self attention neural network in response to inputting the log window into the first self attention neural network. The first self attention neural network may apply a self attention function to the log window using multiple self attention modules to generate the first self attention neural network output. The first self attention neural network output of the first self attention neural network may be generated using a plurality of convolutional layers and self attention layers. As an example, the layers of the self attention neural network may use the Equations 1 through 6 above to generate the output of the first self attention neural network from the log window. The self attention neural network may include multiple self attention modules.

A duplicate self attention neural network output is generated with the duplicate self attention neural network in response to inputting a probe window into the duplicate self attention neural network. The probe window is one of the positive window and the negative window that were previously generated. A first training iteration may use the positive window as the probe window and a subsequent training iteration may use the negative window.

A distance layer output is generated in response to inputting the first self attention neural network output and the duplicate self attention neural network output to a distance layer of the siamese neural network. The distance layer may apply a distance function to determine a distance between the first self attention neural network output and the duplicate self attention neural network output to form the distance layer output. Equation 7 above is one example of a distance function that is applied to the outputs from the self attention neural network and the duplicate self attention neural network to generate the distance layer output.

A siamese neural network output is generated from the distance layer output using an output layer of the siamese neural network. The output layer may apply a function to the distance layer output to generate the siamese neural network output. Equation 8 above is one example of an exponential function that is applied to the distance layer output to generate the siamese neural network output.

The siamese neural network output is compared to a label of the probe window to form a siamese neural network output comparison. The label may be either positive (indicated with "1") or negative (indicated with "0").

The siamese neural network is updated based on the siamese neural network output comparison using backpropagation with the self attention neural network and the duplicate self attention neural network receiving similar updates. The updates may be backpropagated to the self attention neural network and the weights of the self attention neural network may be copied to the duplicate self attention neural network.

The training of the siamese neural network may be repeated. The training may be repeated for multiple log windows, positive windows, negative windows, and well logs from a repository.

Turning to FIG. 3B, the process (320) uses the siamese neural network for detecting well analogues. In Block 322, a query window is selected. The query window may be selected by a user with the user application from a well log or constructed by the user with the user application. The query window has a window size and channels that match the window size and channels for the siamese neural network. The server application uses the siamese neural network to search for well logs from the repository that include windows that are similar to the query window.

In Block 324, a well log of a target well is selected. A user, with the user application, may identify a search space by selecting a group of wells and a group of well logs that correspond to the group of wells. The server application iterates through the wells and well logs selecting a target well and a target well log, which are searched for windows that are similar to the query window.

In Block 326, the well log is split into target windows. The target windows may have a window size that matches the siamese neural network and a relative offset. The relative offset identifies the number of rows between the starting rows of two target windows. With an offset size of one, a target window is generated for the rows of the well log for which there is enough data to satisfy the requirement of the window size. With a larger offset size, the number of target windows will be reduced and may reduce the time spent searching for the query window.

In Block 328, the query window is compared to a target window using the siamese neural network. The siamese neural network receives the query window and the target window. The query window is input to a first self attention neural network that generates a first self attention neural network output by applying one or more convolutional neural networks and self attention functions using one or more convolutional layers and self attention layers. The target window is input to a duplicate self attention neural network that has the same structure and weights as the first self attention neural network and generates a duplicate self attention neural network output. A distance is calculated between the first self attention neural network output and the duplicate self attention neural network output with a distance layer to generate a distance layer output. The distance player output is input to an output layer of the siamese neural network that generates the siamese neural network output, which identifies the similarity between the query window and the target window. The comparison may be repeated for the target windows of the well log and for the well logs of the wells in the search space.

In Block 330, results are presented. The results may include a set of well logs, a set of corresponding windows from the set of well logs, and a set of result outputs. The set of well logs may include the set of corresponding windows that were compared against the query window to generate corresponding result outputs. A well log from the set of well logs includes multiple target windows from which the corresponding window has the highest siamese neural network output of the target windows. The result output is the siamese neural network output for the corresponding with the highest siamese neural network output for a well log. The well logs may be sorted by the result outputs.

A threshold may be applied to the results to filter out well logs and windows that have result outputs that do not satisfy the threshold. For example, well logs and windows with result outputs of less than 0.8 may be removed from the results.

A window, well log, or well may be tagged as having a particular feature or property (e.g., a geophysical formation, etc.) with a tag that identifies the feature. The query window may be tagged with a tag from one of the window, well log, and well from the search results that satisfy the threshold. The window, well log, and well from the search results that satisfy the threshold may be tagged with a tag from the query window.

The presentation may be performed by transmitting the results from the server application to a user application. The user application presents the results by displaying the results on the user device.

Figure 4:
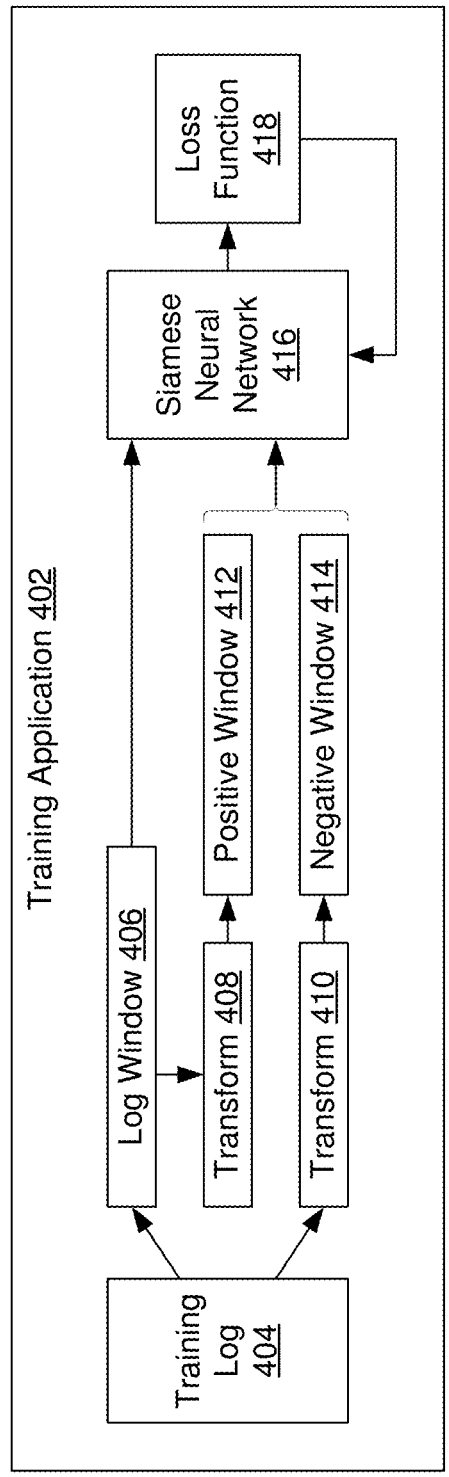
FIG. 4, FIG. 5 and FIG. 6 show examples in accordance with disclosed embodiments.
Figure 5:
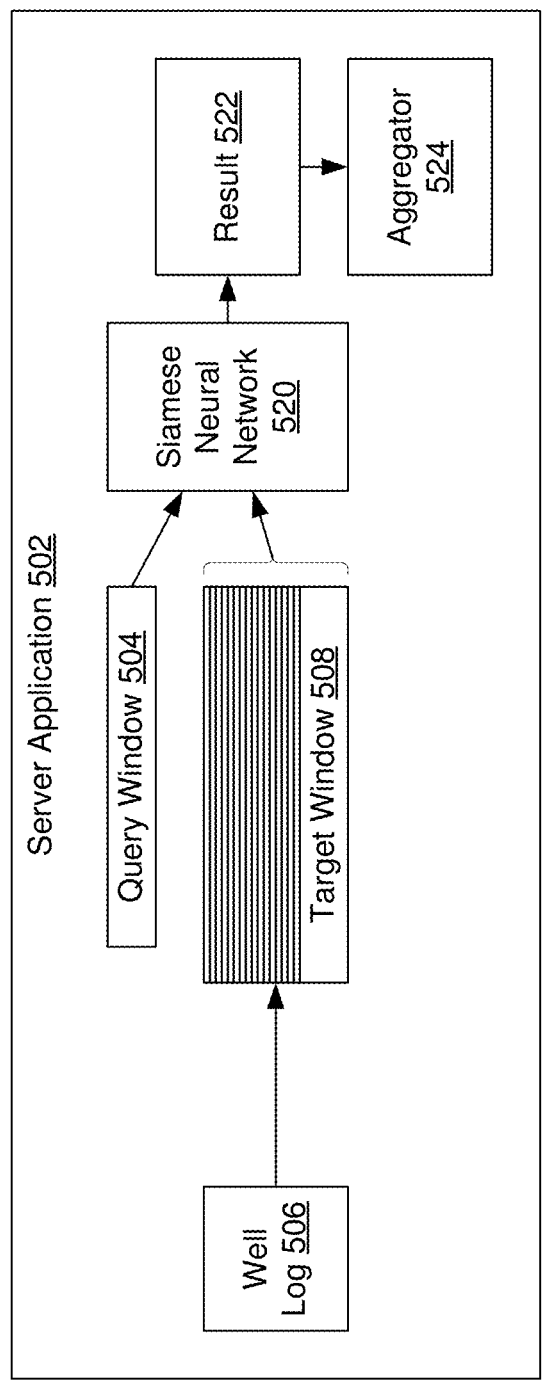
Figure 6:
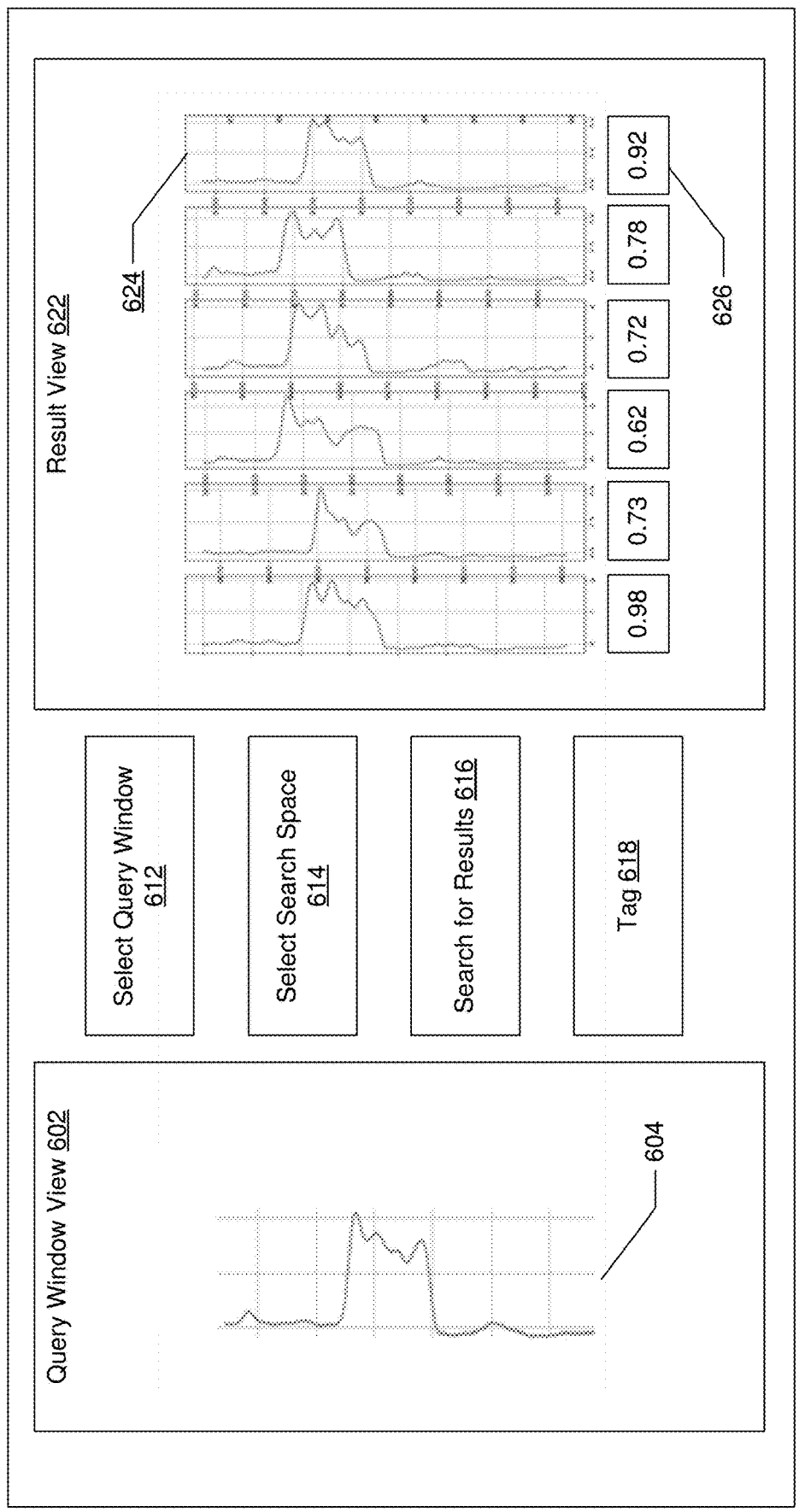

FIG. 4, FIG. 5, and FIG. 6 show examples that may be combined within the system (200) of FIG. 2A. The various elements, widgets, components, and interfaces shown in FIG. 4, FIG. 5, and FIG. 6 may be omitted, repeated, combined, and/or altered as shown. Accordingly, the scope of the present disclosure should not be considered limited to the specific arrangements shown in FIG. 4, FIG. 5, and FIG. 6.

Turning to FIG. 4, the training application (402) trains the siamese neural network (416) to recognize the similarity between the log window (406) and the positive window (412) and to differentiate the log window (406) from the negative window (414).

The training log (404) includes multiple windows of data with one or more channels. The training log (404) may be a historical well log from a repository that maintains multiple well logs from multiple wells.

The log window (406) is selected from the training log (404). The training application (402) may iterate through the training log (404) to train the siamese neural network (416) with individual well logs selected from a set of log windows from the training log (404). The log window (406) may be randomly selected from the training log (404).

The transform (408) may be applied to the log window (406) to generate the positive window (412). The transform (408) may modify the data from the log window (406) by resampling, resizing, realigning, adding noise, etc. to generate the positive window (412).

For the negative window (414), a window that is different from the log window (406) may be randomly selected from the training log (404). The negative window (414) may not overlap the log window (406) or may overlap by less than a threshold percentage amount (e.g., less than 10%). The transform (410) may be applied to the window selected from the training log (404) to generate the negative window (414). The transform (410) may modify the data from the training log (404) by resampling, resizing, realigning, adding noise, etc. to generate the negative window (414).

The siamese neural network (416) receives the log window (406). The siamese neural network (416) also receives one of the positive window (412) and the negative window (414), which is referred to as the probe window. The siamese neural network (416) generates an output from the log window (406) and the probe window. The siamese neural network output indicates the similarity between the log window (406) and the probe window.

The loss function (418) compares the siamese neural network output to a label assigned to the probe window. When the probe window is the positive window (412), the label may be "1" or true. When the probe window is the negative window (414), the label may be "0". Backpropagation is used to update the siamese neural network (416) based on the difference between the siamese neural network output and the label.

Turning to FIG. 5, the server application (502) determines well analogs using the siamese neural network (520). The query window (504) may be selected by a user of the system with a user application. The server application (502) may select a target well from a set of wells in a search space of wells and selects the well log (506) from a set of well logs from a repository that includes data from the target well. The well log (506) is split into multiple target windows, which include the target window (508).

The query window (504) and the target window (508) are input to the siamese neural network (520). The siamese neural network (520) generates result output that identifies the similarity of the query window (504) to the target window (508). The result (522) may include the result output from the siamese neural network (520) and the target window (508), both of which may be sent to the aggregator (524).

The aggregator (524) may be a service of the server application (502) that aggregates multiple results from the siamese neural network (520) for one or more well logs and wells in the search space. The aggregator (524) may assign the highest siamese neural network output for a target window from the well log (506) to the well log (506) as the result output for the well log (506). After assigning the result output to the well log (506), the server application may sort and filter the multiple well logs based on the assigned result outputs.

Turning to FIG. 6, the graphical user interface (600) is presented to and displayed by a device of a user. The graphical user interface (600) may be interacted with by a user to determine well analogues. The graphical user interface (600) includes the user interface elements (602) through (626).

The user interface element (602) is a query window view that displays an image of a query window with the user interface element (604). The query window image is rendered from the query window that is used to search the repository.

The user interface element (612) is a button. Selection of the user interface element (612) may bring up an additional view from which one of multiple query windows may be selected as the query window to use for searching the search space.

The user interface element (614) is a button. Selecting the user interface element (614) may open a search space view from which multiple wells and well logs may be identified as the search space.

The user interface element (616) is a button. Selecting the user interface element (616) may initiate the search for the query window within the well logs of a search space. The search may initiate with nonoverlapping target windows from the wells and logs of the search space to identify a threshold number of wells and logs with the highest ranks. The search may then iterate again using sets of overlapping target windows from the highest ranked wells and logs to further adjust the rankings of the highest ranked wells and logs and refine the search.

The user interface element (618) is a button. Selecting the user interface element (618) may open a tagging view from which the query window may be tagged with a tag from the results or the results may be tagged with a tag from the query window.

The user interface element (622) is a result view. The result view displays results obtained by searching the well logs of the search space with the query window using a siamese neural network with self attention neural networks. The result view displays target windows from the search space with corresponding result outputs and includes the user interface elements (624) and (626).

The user interface element (624) displays an image of a target window from a well log from the search space. The target window image is rendered from the target window from a well log from the search space in the repository.

The user interface element (626) displays the result output from the siamese neural network generated with the query window displayed in user interface element (604) and the target window displayed in user interface element (624). The closer the result output is to 1, the higher the similarity between the query window and the target window.

Embodiments disclosed herein may be implemented on a computing system. Any combination of mobile, desktop, server, router, switch, embedded device, or other types of hardware may be used. For example, as shown in FIG. 7A, the computing system (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), and numerous other elements and functionalities.

The computer processor(s) (702) may be an integrated circuit for processing instructions. For example, the computer processor(s) may be one or more cores or micro-cores of a processor. The computing system (700) may also include one or more input devices (710), such as a touchscreen, keyboard, mouse, microphone, touchpad, electronic pen, or any other type of input device.

The communication interface (712) may include an integrated circuit for connecting the computing system (700) to a network (not shown) (e.g., a local area network (LAN), a wide area network (WAN) such as the Internet, mobile network, or any other type of network) and/or to another device, such as another computing device.

Further, the computing system (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing systems exist, and the aforementioned input and output device(s) may take other forms.

Software instructions in the form of computer readable program code to perform embodiments of the technology may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the technology.

The computing system (700) in FIG. 7A may be connected to or be a part of a network. For example, as shown in FIG. 7B, the network (720) may include multiple nodes (e.g., node X (722), node Y (724)). Each node may correspond to a computing system, such as the computing system shown in FIG. 7A, or a group of nodes combined may correspond to the computing system shown in FIG. 7A. By way of an example, embodiments of the technology may be implemented on a node of a distributed system that is connected to other nodes. By way of another example, embodiments of the technology may be implemented on a distributed computing system having multiple nodes, where each portion of the technology may be located on a different node within the distributed computing system. Further, one or more elements of the aforementioned computing system (700) may be located at a remote location and connected to the other elements over a network.

Although not shown in FIG. 7B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (722), node Y (724)) in the network (720) may be configured to provide services for a client device (726). For example, the nodes may be part of a cloud computing system. The nodes may include functionality to receive requests from the client device (726) and transmit responses to the client device (726). The client device (726) may be a computing system, such as the computing system shown in FIG. 7A. Further, the client device (726) may include and/or perform all or a portion of one or more embodiments of the technology.

The computing system or group of computing systems described in FIGS. 7A and 7B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the technology. The processes may be part of the same or different application and may execute on the same or different computing system.

Rather than or in addition to sharing data between processes, the computing system performing one or more embodiments of the technology may include functionality to receive data from a user. For example, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the technology, may extract one or more data items from the obtained data. For example, the extraction may be performed as follows by the computing system in FIG. 7A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 7A, while performing one or more embodiments of the technology, may perform data comparison. Data comparison may be used to compare two or more data values (e.g., A, B). For example, one or more embodiments may determine whether A>B, A=B, A!=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the technology, A and B may be vectors, and comparing A with B includes comparing the first element of vector A with the first element of vector B, the second element of vector A with the second element of vector B, etc. In one or more embodiments, if A and B are strings, the binary values of the strings may be compared.

The computing system in FIG. 7A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 7A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents a few examples of functions performed by the computing system of FIG. 7A and the nodes and/or client device in FIG. 7B. Other functions may be performed using one or more embodiments of the technology.

While the technology has been described with respect to a limited number of embodiments, those skilled in the art, having benefit of this disclosure, will appreciate that other embodiments can be devised which do not depart from the scope as disclosed herein. Accordingly, the scope of the technology should be limited only by the attached claims.

What is claimed is:

1. A method comprising:
  collecting a training log from a plurality of well logs;
  creating a log window of a plurality of log windows from the training log;
  creating a positive window from the log window;
  creating a negative window from the training log; and
  training a siamese neural network (SNN) that includes a first self attention neural network (ANN) and a duplicate self attention neural network with the log window, the positive window, and the negative window, to recognize a similarity between the log window and the positive window and to differentiate against the negative window, wherein training the siamese neural network comprises generating the first self attention neural network output of the first self attention neural network using a plurality of convolutional neural networks.

2. The method of claim 1, wherein training the siamese neural network comprises:
  generating a first self attention neural network output with the first self attention neural network in response to inputting the log window into the first self attention neural network;
  generating a duplicate self attention neural network output with the duplicate self attention neural network in response to inputting a probe window into the duplicate self attention neural network, wherein the duplicate self attention neural network is within the siamese neural network and is a duplicate of the first self attention neural network;
  generating a distance layer output in response to inputting the first self attention neural network output and the duplicate self attention neural network output to a distance layer of the siamese neural network; and
  generating a siamese neural network output from the distance layer output using an output layer of the siamese neural network.

3. The method of claim 2, wherein training the siamese neural network comprises:
  comparing a siamese neural network output to a label of a probe window to form a siamese neural network output comparison; and
  updating the siamese neural network based on the siamese neural network output comparison using backpropagation with the first self attention neural network and the duplicate self attention neural network receiving similar updates.

4. The method of claim 1, further comprising:
selecting a query window of a plurality of query windows;
selecting a well log of a target well;
splitting the well log into a plurality of target windows;
comparing the query window to a target window of the plurality of target windows using the siamese neural network with the first self attention neural network after training to generate a result output; and
presenting a result that includes the target window and the result output.

5. The method of claim 1, further comprising:
tagging a query window with a tag from one of a group comprising a target window, a well log of the target window, and a target well of the target window.

6. The method of claim 1, further comprising:
tagging one of a group comprising a target window, a well log of the target window, and a target well of the target window with a tag from a query window.

7. A method comprising:
collecting a query window of a plurality of query windows;
collecting a well log of a target well;
splitting the well log into a plurality of target windows;
comparing the query window to a target window of the plurality of target windows using a siamese neural network (SNN) that includes a self attention neural network (ANN) to generate a result output, wherein the siamese neural network is trained with a log window, a positive window, and a negative window, to recognize a similarity between the log window and the positive window and to differentiate against the negative window; and
presenting a result that includes the target window and the result output.

8. The method of claim 7, further comprising:
tagging the query window with a tag from one of a group comprising the target window, the well log of the target window, and the target well of the target window.

9. The method of claim 7, further comprising:
tagging one of a group comprising the target window, the well log of the target window, and the target well of the target window with a tag from the query window.

10. The method of claim 7, further comprising:
wherein training the siamese neural network comprises:
generating a first self attention neural network output with the self attention neural network in response to inputting a training window into the self attention neural network;
generating a duplicate self attention neural network output with a duplicate self attention neural network in response to inputting a probe window into the duplicate self attention neural network, wherein the duplicate self attention neural network is within the siamese neural network and is a duplicate of the self attention neural network;
generating a distance layer output in response to inputting the first self attention neural network output and the duplicate self attention neural network output to a distance layer of the siamese neural network; and
generating a siamese neural network output from the distance layer output using an output layer of the siamese neural network.

11. The method of claim 7, further comprising:
wherein training the siamese neural network comprises:
comparing a siamese neural network output to a label of a probe window to form a siamese neural network output comparison; and
updating the siamese neural network based on the siamese neural network output comparison using backpropagation.

12. A system comprising:
a memory coupled to a processor; and
a training application that executes on the processor, uses the memory, and is configured for:
collecting a training log from a plurality of well logs;
creating a log window of a plurality of log windows from the training log;
creating a positive window from the log window;
creating a negative window from the training log; and
training a siamese neural network (SNN) that includes a first self attention neural network (ANN) and a duplicate self attention neural network with the log window, the positive window, and the negative window, to recognize a similarity between the log window and the positive window and to differentiate against the negative window, wherein training the siamese neural network comprises generating the first self attention neural network output of the first self attention neural network using a plurality of convolutional neural networks.

13. The system of claim 12, wherein training the siamese neural network comprises:
generating a first self attention neural network output with the first self attention neural network in response to inputting the log window into the first self attention neural network;
generating a duplicate self attention neural network output with the duplicate self attention neural network in response to inputting a probe window into the duplicate self attention neural network, wherein the duplicate self attention neural network is within the siamese neural network and is a duplicate of the first self attention neural network;
generating a distance layer output in response to inputting the first self attention neural network output and the duplicate self attention neural network output to a distance layer of the siamese neural network; and
generating a siamese neural network output from the distance layer output using an output layer of the siamese neural network.

14. The system of claim 12, wherein training the siamese neural network comprises:
comparing a siamese neural network output to a label of a probe window to form a siamese neural network output comparison; and
updating the siamese neural network based on the siamese neural network output comparison using backpropagation with the first self attention neural network and the duplicate self attention neural network receiving similar updates.

15. The system of claim 12, further comprising:
a server application that executes on the processor, uses the memory, and is configured for:
selecting a query window of a plurality of query windows;
selecting a well log of a target well;
splitting the well log into a plurality of target windows;
comparing the query window to a target window of the plurality of target windows using the siamese neural network with first the self attention neural network after training to generate a result output; and
presenting a result that includes the target window and the result output.

16. The system of claim 12, further comprising:
a server application that executes on the processor, uses the memory, and is configured for:
tagging a query window with a tag from one of a group comprising a target window, a well log of the target window, and a target well of the target window.

17. The system of claim 12, further comprising:
a server application that executes on the processor, uses the memory, and is configured for:
tagging one of a group comprising a target window, a well log of the target window, and a target well of the target window with a tag from a query window.

\* \* \* \* \*